Feb. 8, 1966          F. OPPENHEIMER          3,233,333

METHOD OF FREEZE DRYING FOOD PRODUCTS

Filed June 1, 1962          3 Sheets-Sheet 1

INVENTOR.
FRANZ OPPENHEIMER
BY
ATTORNEY

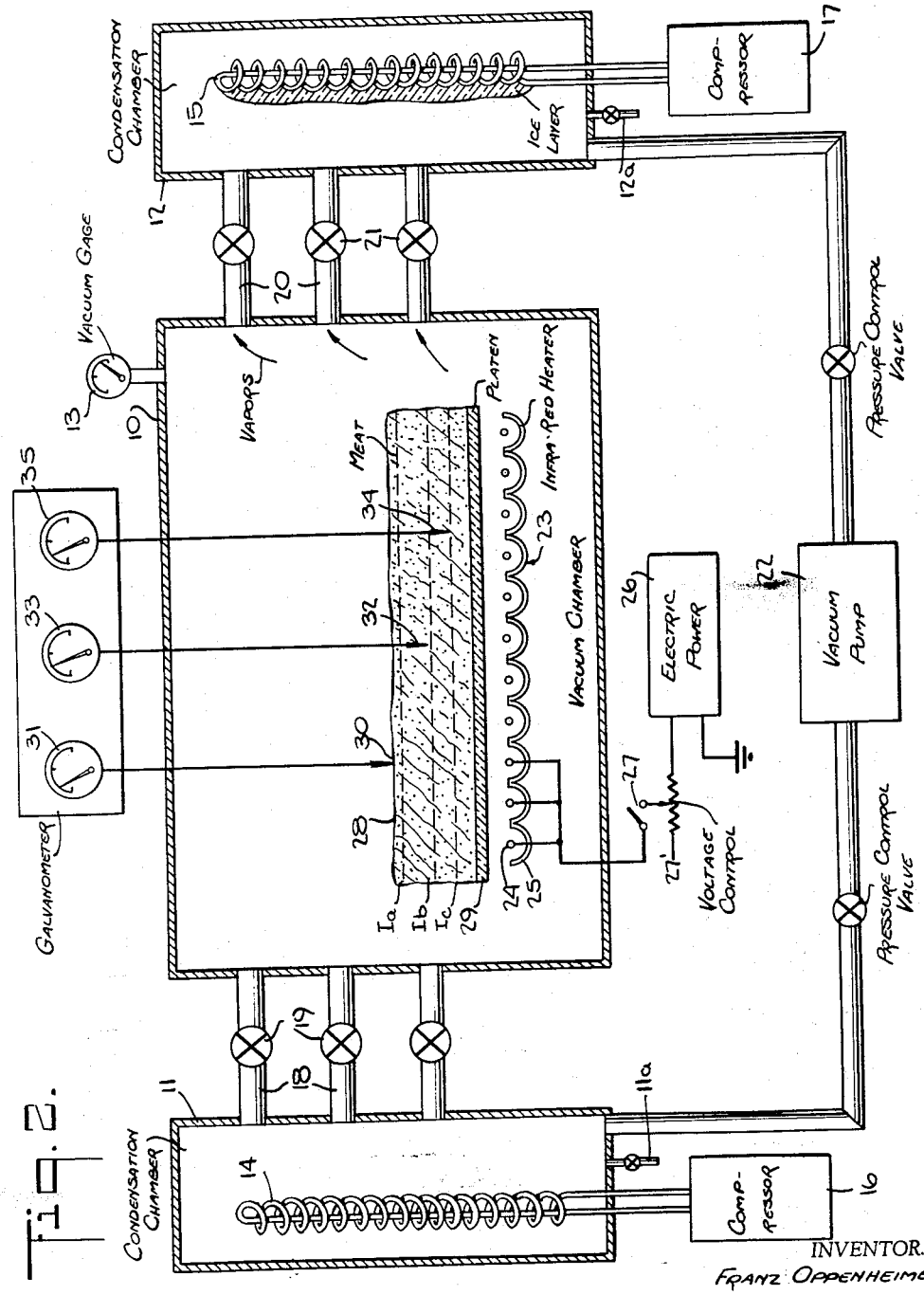

Feb. 8, 1966  F. OPPENHEIMER  3,233,333
METHOD OF FREEZE DRYING FOOD PRODUCTS
Filed June 1, 1962  3 Sheets-Sheet 3
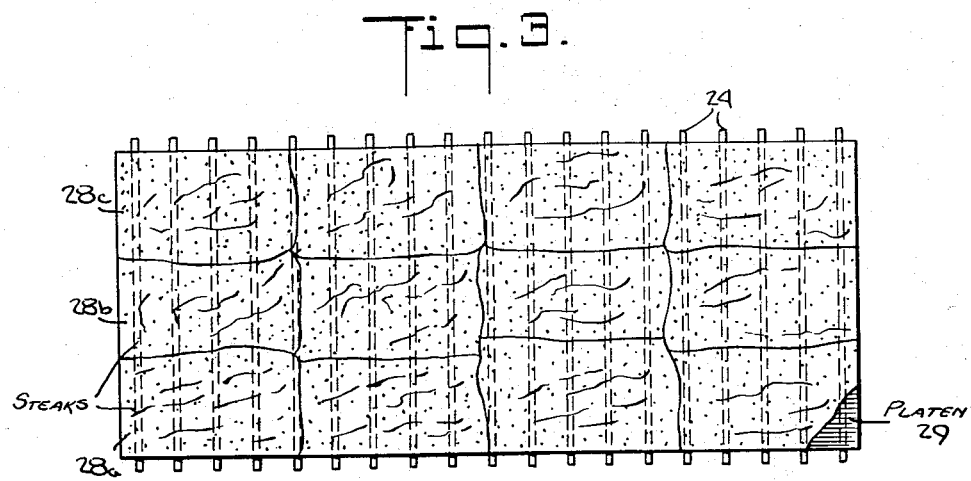
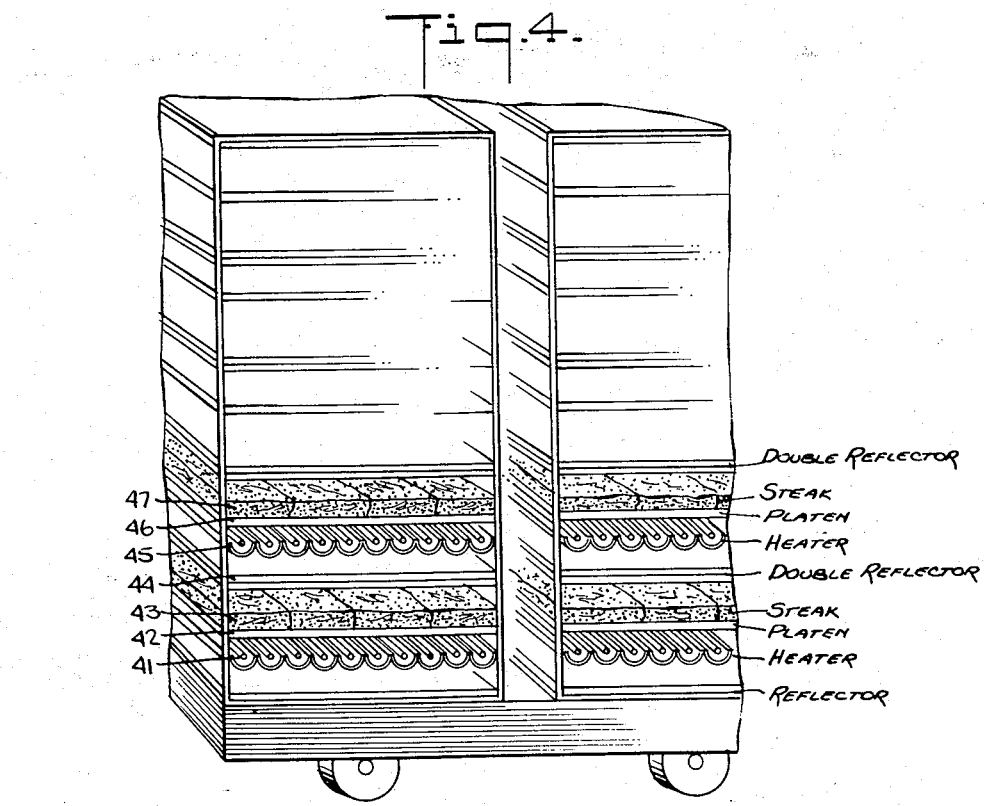
INVENTOR.
FRANZ OPPENHEIMER
BY Michael Ebert
ATTORNEY

United States Patent Office 3,233,333
Patented Feb. 8, 1966

3,233,333
METHOD OF FREEZE DRYING FOOD PRODUCTS
Franz Oppenheimer, 900 N. Michigan Ave., Chicago, Ill.
Filed June 1, 1962, Ser. No. 199,341
7 Claims. (Cl. 34—5)

This invention relates generally to freeze drying techniques, and more particularly to a method and apparatus for freeze drying meats and other foods having a cellular structure, without materially impairing the physical qualities of the food products and without substantially changing the odor, taste or texture thereof.

Various methods are known and in common use for preserving food products, among which are canning, freezing and dehydration. The principal advantages of dried foods over canned and frozen products are decreased weight and greater storage stability. However, ordinary high-temperature or vacuum drying methods bring about several undesirable changes, including pronounced shrinkage of the food, the loss of volatile constituents, case hardening and the migration of dissolved constituents to the food surface. As a consequence, the dessicated product, when reconstituted, differs noticeably in physical appearance and taste from the original product.

A major improvement in the dehydration of food is the freeze drying process wherein the material is first frozen and the water of composition is then removed by sublimation whereby the solidified water is converted to vapor without passing through a melting phase. Sublimation is normally carried out in a high vacuum, drying being promoted by supplying the latent heat of sublimation from an appropriate heat source.

In freeze drying, the components of the food product are locked together in the frozen state and physical changes and chemical reactions are inhibited, thereby minimizing the loss of volatile components. This process overcomes many of the drawbacks of conventional drying methods, for shrinkage of the material and migration of dissolved constituents are eliminated by maintaining the material in the frozen state until it is dry.

Products which are freeze dried are highly porous and are quickly reconstituted by adding water, the reconstituted product being in substantially all instances almost identical to the fresh material both as to appearance and palatability. Such products can be kept safely for protracted periods in storage at room temperature in the absence of moisture and oxygen, i.e., in an inert atmosphere within a hermetically sealed container.

Thus freeze-dried products, even though produced by a relatively costly process are of strong interest to the armed forces and civil defense agencies, for they make possible the long-term storage of surplus foods without refrigeration. Freeze dried foods also have a commercial potential of great value in that such foods may be shipped and stored without the need for costly refrigeration systems, and this fact in many instances more than balances out processing expenses. Furthermore, since the weight of foods is made up in large part by its water of composition, a substantial reduction in shipping costs is brought about by freeze-drying.

Despite the advantages inherent in freeze-drying as opposed to other preservation methods, it has not enjoyed widespread commercial success in connection with meats and other food products formed of tissue. There are a number of factors which have contributed to the relative failure of the freeze dry process, and these factors will now be analyzed. In the case of steaks or chops whose internal structure is constituted by a network of capillaries communicating with cells filled with protoplasm and other liquid-containing constitutents, the conventional freeze dry technique has destructive effects on this structure. In freezing such tissue, ice crystals are formed which tend to rupture the capillaries and cells, thereby impairing the texture and other properties of the food. When reconstituted, food products so treated often lack the color, texture and taste of the fresh product. Texture is an important element in the sensory experience of eating food, for a change in texture is quickly recognized by the consumer.

In freeze-drying, two basic freezing methods are in use; namely, prefreezing and evaporation freezing. In prefreezing, the material is first frozen by refrigeration equipment before being placed in a vacuum chamber for sublimation, whereas in evaporation-freezing the material is placed in the unfrozen state in the chamber, and freezing is carried out by the cooling action which accompanies evaporation. In either case, with conventional freezing methods at $-20°$ C. to $30°$ C., the formation of ice crystals has a tendency to disrupt the internal structure of meats and other cellular products.

Moreover, evaporation-freezing has heretofore been found unsatisfactory for meat products, in that sufficient surface drying takes place in the unfrozen state to cause salt encrustation or case hardening. Such caking gives rise to a hard, relatively impervious layer at the food surface, this being caused mainly by the migration of dissolved constituents to the surface when drying. This impervious layer acts to lower the rate of drying and also slows down reconstitution.

It is also important in successful freeze-drying to avoid scorching, burning or cooking of the food product. However, with standard techniques, when supplying the latent heat of evaporation, it becomes difficult uniformly to subject food to heat rays. Thus hot spots are developed which result in burning and discoloration of the food. Overheating gives rise to a browning reaction which not only discolors the food but markedly alters its taste and flavor.

The three main types of heating used in freeze-drying are conduction, dielectric and radiant heating, and these will now be separately considered.

In conduction heating, the latent heat of sublimation is applied by direct heat transfer from heated plates or shelves on which the material to be treated is placed. During dessication, the frozen material is progressively dehydrated from its surface to its center. The ice phase boundary at which sublimation occurs thus recedes from the heated surfaces.

In conduction heating, dehydration becomes progressively slower during dessication because of the low thermal conductivity of the dessicated layer separating the ice phase boundary from the heating plates during the latter stages of drying. Dessicated meat has a low thermal conductivity which is as little as 1% of the same meat when in the frozen state. Hence the surface may become overheated and scorched during dessication of the center. Also in drying irregularly shaped pieces, such as chicken parts, contact with the plate is poor and the rate of heat transfer is consequently reduced.

In dielectric heating, the food is placed between electrodes and subjected to a high-frequency electric field. The food acts as a dielectric, radio-frequency energy being absorbed by the frozen material. Such heating has not proved to be commercially feasible, for it causes ionization and spark discharges in the residual gas in the vacuum chamber and has the effect of burning or scorching the food. However, if the voltage is decreased to avoid ionization, the rate of heating becomes so low as to nullify whatever advantage dielectric heating has over other methods. Moreover, food is not characterized by a uniform and homogeneous dielectric constant, hence dielectric heating produces highly irregular results and is difficult to control.

In radiant heating, infra-red coils or heaters are ordinarily used as the primary heat source. Radiant heat has the advantage of distributing the heat uniformly over the surface of the food without requiring contact therewith. However, most solid food products are relatively opaque to infra-red radiation, and as drying normally takes place from all surfaces of the product laid on a tray, it is difficult to maintain the optimum rate of heat input necessary to penetrate the food without at the same time burning the dry surface. Only in the initial stages of drying does sublimation take place from a frozen surface. As soon as the ice boundary recedes below the outer surface, thermal resistance is presented by the outer porous layers. If the heat is applied at a slow enough rate to avoid damage to the dried material, the process is slowed up to a point where it will take as much as twenty-four hours to dry a beef steak of average size.

In view of the foregoing, it is the primary object of the present invention to provide an improved and commercially feasible process for freeze-drying food products having a cellular structure, which process obviates the drawbacks incident to prior-art techniques.

More specifically, it is an object of this invention to provide a practical, efficient and relatively rapid method and apparatus for freeze-drying food products having a cellular structure without disrupting the internal structure of the food, without case hardening and without scorching or cooking the surfaces thereof. A significant feature of the invention is that it is capable of producing dried food products of excellent color and quality, which when rehydrated after prolonged storage, recovers the properties of the fresh product and is almost indistinguishable therefrom.

It is also an object of this invention to provide an improved method and apparatus for applying radiant heat to frozen food to sublimate its water of composition wherein the ice phase boundary on which the heat rays impinge, remains unchanged at one surface of the food product during dessication, the vapors emanating from the opposing surface thereof, and the boundary receding only from this surface, thereby accelerating the drying process without deleterious overheating of the food.

Still another object of the invention is to provide a rapid freeze-dry technique which may be carried out on a batch basis or a semi-continuous or continuous basis.

Briefly stated, these objects are accomplished by a process wherein food, which is initially in a fully hydrated condition and at a temperature a few degrees above the freezing point, is placed in a vacuum chamber. The pressure of the chamber is lowered in a series of steps over a relatively short period of time, during which the temperature throughout the food remains substantially unchanged with an even temperature throughout, this action serving to withdraw gases and some liquid from the food and to partially evacuate the capillaries and cells of the food tissue before freezing occurs. The pressure is thereafter reduced and the temperature of the food caused to drop evenly throughout to the freezing point and substantially therebelow, thereby causing solid freezing of the food and the formation of ice crystals therein. The partial evacuation of the capillaries and cells prevents rupture thereof by said crystals.

Heat is thereafter applied to the frozen food through a vapor-impervious platen which is, however, permeable to infra-red rays, the under-surface of the food being pressed there-against in a manner sealing its pores, whereby sublimation from the ice boundary occurs only from the free surface of the food, the ice boundary therefore receding unidirectionally and inwardly from the free surface until it reaches the sealed surface. In this manner, the ice boundary on which the heat rays impinge does not recede therefrom and the transfer of energy in the course of dessication is optimized by conduction through the ice block.

For a better understanding of the invention as well as other objects and further features thereof, reference is made to the following detailed description to be read in conjunction with the accompanying drawings, wherein:

FIG. 2 is a schematic diagram of a preferred embodiment of freeze-dry equipment in accordance with the invention;

FIG. 3 is a plan view of food products as placed on the radiant heating platen; and FIG. 4 is a carriage for introducing a batch of food to be treated in a vacuum chamber.

GENERAL DESCRIPTION OF PROCESS

Figure 1:
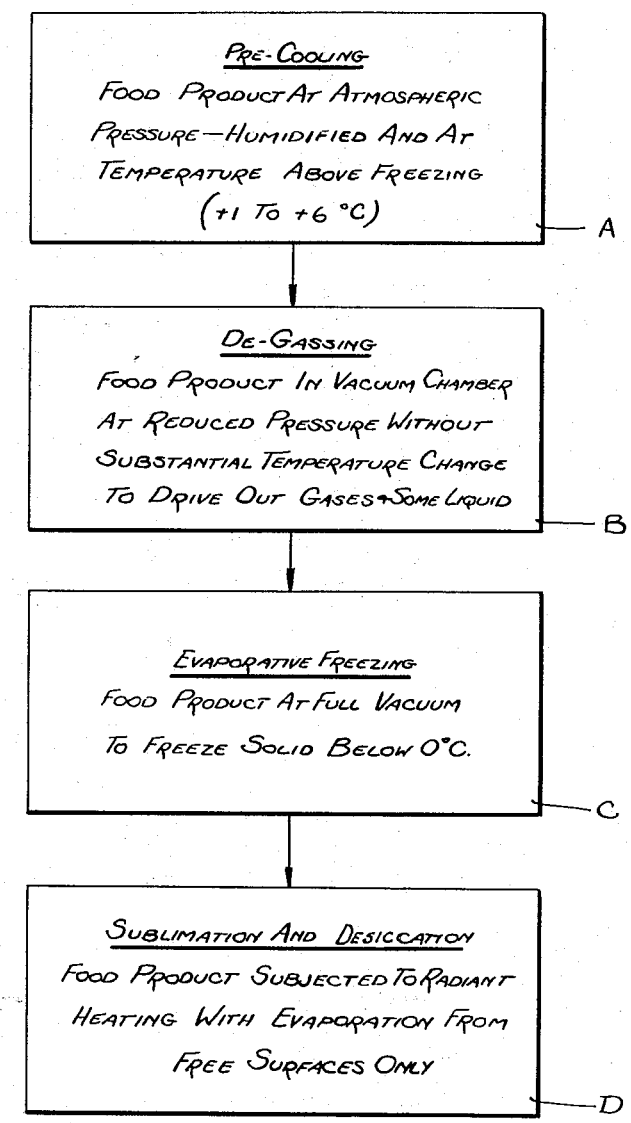
FIG. 1 is a flow chart descriptive of the process in accordance with the invention.

Referring now to the drawings, and more particularly to FIG. 1, we shall first consider in general terms the succession of steps which constitute a freeze-drying process in accordance with the invention. The invention is concerned primarily with freeze-drying of commodities having cellular structures, including such meats as beef, lamb, pork and chicken, and such fish as shrimp, crabmeat, lobster and scallop.

The material to be dried must be held under vacuum in a chamber during the drying process. The absolute pressure required will depend on the physical characteristics of the material and on the temperatures at which the frozen material must be held. Two types of equipment may be used for freeze-drying, namely; mechanical vacuum pumps and steam jet ejectors. The vapor formed by sublimation can be pumped out directly or can be removed ahead of the pump by a condenser.

The first step A of the process, which is called pre-cooling, is concerned with the condition of the food product before it is placed in the vacuum chamber. In order to obtain effective results it is important that the food before freeze-drying be maintained in a humid or supersaturated atmosphere to prevent loss of moisture. The food should be refrigerated to a point close to freezing evenly throughout, i.e., the food before insertion in the vacuum chamber should be in a temperature range of $+1$ to $+4°$ C., and preferably at about $2°$ C.

In the second step B, called de-gassification, the cold and humid food is placed in a vacuum chamber, and the pressure therein is reduced in a succession of steps which serve to cause removal of gases from the internal structure of the food including oxygen from the cells and some moisture, but without substantially lowering the temperature of the food. This step, which is carried out within a relatively brief period, say a half hour, serves to prepare the food for freezing. De-gassification must be carried out in a series of progressive steps in order to prevent an excessive rate of de-gassification which might result in gas explosions with disruptive results.

Step B has a two-fold purpose. First, it partially evacuates the capillaries and cells of the food so that upon subsequent freezing the ice crystals occupy the evacuated space, thereby minimizing internal explosions which burst the capillary walls and cell membranes. Second, the removal of gases produces a bubble-free or gas-free ice block having relatively high thermal conductivity as compared to a gas-containing ice block, thereby accelerating sublimation when heat is applied thereto.

In the third step C, called evaporation freezing, a full vacuum is drawn in the chamber, and the de-gassed food is frozen solid by evaporative cooling, an ice pack being formed which extends throughout the body of the food and is contiguous with the faces or surfaces thereof.

In the fourth and final step D, called sublimation radiant heat is applied to one surface of the food, the food having been initially placed on and pressed against an infra-red permeable platen in such a manner as effectively to seal the contacting pores thereof. In this way the infra-red rays impinge on the surface of the ice-pack, engaging the platen, and are conducted by the pack throughout the food product. Sublimation can occur only from the free surface of the food, thus the ice phase recedes not from the platen-contacting surface exposed to the rays, but from the free surface, and water vapor passes out through a porous layer of the material in order to escape into the vaccum chamber.

The ice boundary therefore moves inwardly and unidirectionally from the free surface to the contacting surface until the food is entirely dessicated. Thus until the ice at the very bottom boundary is sublimated, the food is not completely dried and the vapors passing through the fibers prevent cooking thereof.

It is important to note that at all times the latent heat of sublimation is supplied at the surface of the ice without having to penetrate a porous layer, thereby minimizing thermal resistance and accelerating the sublimation process. This is in contradistinction to the usual process in which drying takes place from the surface to which heat is applied and the heat must be conducted through a progressively thicker layer of dried material having a very poor thermal conductivity.

DESCRIPTION OF FREEZE-DRYING APPARATUS

Referring now to FIG. 2, the apparatus for carrying on the process is illustrated, the apparatus comprising a vacuum chamber 10 having a door or cover for admitting food, and a pair of condensation chambers 11 and 12 communicating therewith, on either side of the chamber. The pressure within the chamber is measured by a suitable gauge 13, such as the McLeod type, and leak-detector means may also be provided.

The condensation chambers each contain a freezing coil 14 and 15 for removing sublimated vapors from the chamber, the coils being connected to conventional compressors 16 and 17, respectively, adapted to pump a boiling refrigeration fluid therethrough, such as Freon or propane. In order to maintain the coils at a uniform temperature, the coils may be connected to the compressor through a suitable manifold. The condensation chamber 11 is coupled to the vacuum chamber through large ducts 18 provided with valves 19, and chamber 12 is similarly coupled to the vacuum chamber through ducts 20 having valves 21 therein.

The condensation chambers are arranged so that all vapor must flow past it in order to reach the vacuum pump 22. As drying proceeds, a layer of ice is built up on the condenser coils. The condensation area of the condenser should therefore be large enough so that the ice thickness is not excessive. Upon completion of a run, the condenser coils may be defrosted by steam, hot water, or other conventional means, and the fluid run out through valved outlets 11a and 11b. If the operation is continuous, rotary condensers may be used to remove the ice by means of rotating scraping blades.

Horizontally mounted within the vacuum chamber in any suitable manner is an infra-red heater 23 constituted by an array of wire-like heating elements 24 disposed in parallel relation, each lying at the focal point of an individual parabolic reflector 25. The heater elements are preferably of the high-voltage type, and are supplied from a power source 26 through a switch 27 and a suitable voltage-adjusting element 27', such as a saturable core reactor. The elements 24 are black bodies which are caused to glow between 250° C. and 1500° C. to emit at least 60% of their total radiation in the spectral range of $1\mu$ to $10\mu$.

The food 28 to be dried is supported directly above the heating array on a flat, non-porous platen 29 which is effectively permeable to infra-red energy and is not heated thereby. A glass plate such as Corning No. 7280 may be used for this purpose, but preferably the material is a solid plastic sheet which is effectively transparent to infra-red radiation, such as one constituted by polymerized propylene material or a heat-resistant synthetic having similar structural and optical properties. The food-supporting members should have minimum heat capacity so that there is no greater evaporation of water in the liquid state than is necessary to freeze the material.

The temperature of the food within the chamber is sensed by three thermocouple probes. Preferably the probes are constituted by very thin-gauge wires (i.e., 25–50 microns in diameter) enclosed in hypodermic needle tubing, in order to minimize heat conduction and thereby obtain true readings. Thermistors may be used for the same purpose. Probe 30 tests the temperature on the top surface of the food, and is coupled to a galvanometer 31 or other indicating or recording means. Probe 32 penetrates the food at the half depth point, and is coupled to galvanometer 33, while probe 34 lies half-way between probe 32 and the bottom surface, and is coupled to galvanometer 35. Thus the thermocouples effectively afford readings of the temperature throughout the body of the food.

EXAMPLES OF FREEZE DRYING

Examples will now be given as to how this apparatus is used to freeze-dry various food products in accordance with the principles underlying the invention.

Example I—(Steak)

We shall first consider the freeze-drying of steak. The steak is kept in a humid condition in a refrigerator, and before being placed in the chamber, is at a temperature in the range of $+1°$ C. to $+4°$ C., preferably at 2° C. After taking the steak out of the pre-cooler, it is pressed firmly down on platen 29 to seal off all of its under-surface pores. In practice, as shown in FIG. 3, a group of steaks 28a, 28b, 28c, etc., is shaped or contoured so that the steaks occupy all of the available space on the platen, and effectively form a mosaic thereon which excludes all interstitial spaces. Hence the vapors can emanate only from the free surfaces of the steaks.

With the pre-cooled steaks in the vacuum chamber, we start to pull a vacuum for a period, say, of 5 to 10 minutes, at which the pressure is about 10 millimeters. The temperature of the steak, as indicated by the three thermocouples inserted in one of them, will not change significantly at this point.

Then the pressure is further reduced to, say, 5 millimeters, and held at this level for about 10 to 15 minutes, during which gases and some liquid in the steaks are withdrawn. The temperature, as indicated by the thermocouples will still read about 2° C. All readings mentioned herein are in degrees centigrade.

Now that the steaks have been de-gassed, the pressure is further reduced to 3 millimeters, and the temperature drops to about −2° (thermocouple 31), −2° (thermocouple 33), and −2° (thermocouple 35), and then proceeds to move downward. At this point the meat is frozen and full vacuum is slowly applied (less than 200 microns) and in about 10 minutes the temperatures are now down to about −28°, depending upon the final vacuum and the water vapor pressure controlled by the temperature of the cooling coils.

The heater switch 27 is then closed to activate the infra-red heaters to supply the latent heat of sublimation. As pointed out previously, vaporation from the under-surface is blocked by the platen 29, hence the vapors are emitted from the free surfaces of the food, and the ice boundary represented by dash-lines Ia, Ib and Ic, recedes progressively from the top surface, the vapors passing through the dried pores of the food and into the vacuum chamber and from there to the condenser 11 where they form ice on the coils. When condenser 11 reaches its ice capacity, the valves thereof are closed, and the valves of condenser 12 opened to put this condenser into operation.

In practice, during sublimation, the temperature of the thermocouples will remain at about −20° C. for 3 to 4 hours and the surface temperature will then rise to about −18° C., then −15° C., and at the end of 6 hours it will reach 0° C. When the bottom thermocouple reaches about +15° C., the wattage of the heater is cut down until no further rise in temperature occurs. In the drying cycle, the temperature, as indicated by the surface probe, should not be permitted to rise above 15° C.

*Example II—(Pork chops)*

Starting with pork chops at an initial temperature of +6° C., +6° C. and +6° C., the chops are pressed down on the platen to close off the under-surface pores, and then placed in the vacuum chamber, very much as in the case of the steak in Example I.

The pressure in the chamber is reduced in about 2 minutes to 10 millimeters, and kept at this level for about 10 minutes, the temperature remaining at +6°, +6°, +6°. Then the pressure is brought down to 5 millimeters in about 2 minutes, and there kept for 10 minutes, the temperatures falling to about +2°, +2°, +2°, during which de-gassing occurs.

The pressure is again dropped, this time down to 3 millimeters in one minute, the temperature dropping to −2° C., −2° C., −2° C. for about 9 minutes and then to −5° C., −5° C., −3° C. Then at full vacuum (300 microns), within one minute the temperatures are −13° C., −13° C., −6° C. Four minutes later (250 microns) it is −23°, −28°, −13° C. Eleven minutes later (150 mircons) it is −27°, −33°, −29° C.

The heater switch is then turned on and heating proceeds, for several hours, being careful never to allow any of the temperatures to rise above +15° C., until full dessication is accomplished.

*Example III—(Chicken)*

In the case of chicken, the chicken is first cooked with a view to later using the dessicated product for stews and the like, simply by putting it in water. The cooked chicken is refrigerated for pre-cooling, and placed on a porous plastic screen or grid in the vacuum chamber at +4° C., +4° C., +4° C. The pressure is dropped to 10 millimeters and held for five minutes, the temperature then being unchanged. The pressure is reduced to 5 millimeters, and after 12 minutes of de-gassing, the temperature is +2°, +2°, +2° C. Then the pressure is further lowered to 3 millimeters, and after 5 minutes the temperatures are −3°, −4°, −5° C. At full vacuum, after 8 minutes, the temperatures fall to −21, −23, −27° C.

The heaters are then turned on and sublimation occurs for several hours (i.e. 4 or 5 hours), the temperature never being permitted to rise above +20° C. It is to be noted that in the case of chicken parts, it is not possible to seal the bottom pores because of the irregularity of the parts, and in this case heat can be applied to the upper and lower surfaces at the same time. It is preferable to heat from the bottom first and later from the top, so as to create initial porosity on the top, to permit more vapor to escape from the top, which will maintain the chicken mass cool.

COMMERCIAL PRODUCTION

In actual practice, the operation may be carried out on a mass-production batch basis by the use of a wheeled tray, as shown in FIG. 4. The tray may be of wire construction to define shelves for supporting the various components in stacked arrangement. Each stack consists, starting from the bottom, of an infra-red reflector 40, above which is a parabolic reflector and heater assembly 41, a platen 42 and a charge of food 43. The reflector upper surface is highly polished to upwardly direct the rays into the food. Above the food 43 is a double-walled reflector 44 whose under-surface 44a is black to absorb rays and thereby prevent back reflection, and whose upper surface 44b is polished to upwardly direct rays from a second heater assembly 45 into a platen 46 carrying another charge of food 47. This succession of reflector-heater-platen-food is repeated in the stack.

The wheeled tray or carriage is arranged to carry several stacks of this type with some lateral separation therebetween to allow for the flow of vapors. The carriage may be set up with food outside of the chamber, and then wheeled therein for a mass batch operation. For continuous operation, a similar structure may be used for travel through suitable vacuum locks in a succession of chambers.

While there have been shown what are considered preferred embodiments of the invention, it is to be understood that many changes may be made therein without departing from the essential spirit thereof as defined in the annexed claims.

What is claimed is:
1. The method of freeze-drying food having a cellular structure, comprising the steps of:
   (a) pre-cooling the food to reduce its temperature to a point close to the freezing point of its water of composition,
   (b) de-gassing the pre-cooled food in a vacuum chamber by gradually reducing the pressure therein to a level at which the temperature of the pre-cooled food remains substantially unchanged and at a first rate at which gases are partially evacuated from the cellular structure of the food without disruptive results,
   (c) evaporatively freezing the de-gassed food by further reducing the pressure in said chamber at a faster rate to a level causing the food to be frozen solid to form ice crystals therein which occupy the spaces vacated by said gases without rupturing the cellular structure, and
   (d) sublimating the water of composition of said frozen food by applying heat thereto in said chamber to dry the food.

2. The method of freeze-drying food having a cellular structure, comprising the steps of:
   (a) pre-cooling the food in a supersaturated atmosphere to reduce its temperature to a point close to the freezing point of its water of composition,
   (b) de-gassing the pre-cooled food by placing it in a vacuum chamber and progressively reducing the pressure therein to a level at which the temperature of the pre-cooled food remains substantially unchanged and at a first rate at which gases are partially evacuated from the cellular structure of the food without disruptive results,
   (c) evaporatively freezing the de-gassed food by further reducing the pressure in said chamber at a faster rate to a level causing the food to be frozen solid to form ice crystals which occupy the spaces vacated by said gases without rupturing the cellular structure, and
   (d) sublimating the water of composition of said frozen food by applying heat thereto in said chamber to dry the food.

3. The method as set forth in claim 2 wherein said food is pre-cooled to reduce its temperature to points within a range of +1° C. to +4° C.

4. The method of freeze-drying food formed of tissues having a network of capillaries communicating with a multiplicity of cells, comprising the steps of:
   (a) pre-cooling the food in a humid atmosphere to reduce its temperature to a point close to the freezing point of its water of composition,
   (b) de-gassing the pre-cooled food in a vacuum chamber by gradually reducing the pressure therein to a level at which the temperature of the pre-cooled food remains substantially unchanged and at a first rate at which gases are partially evacuated from said capillaries and cells of the food without disruptive results, (c) evaporatively freezing the de-gassed food by further reducing the pressure in said chamber at a faster rate to a level causing the food to be frozen solid to form ice crystals which occupy the spaces vacated by said gases without rupturing the capillaries and cells, and (d) sublimating the water of composition of said frozen food by applying heat thereto in said chamber to dry the food.

5. The method as set forth in claim 4, wherein said heat is derived from infra-red radiators emitting at leasst 60% of their spectral radiation in the range of $1\mu$ to $10\mu$.

6. The method of freeze-drying food having a cellular structure having external pores, comprising the steps of:

(a) pre-cooling the food to reduce its temperature to a point close to the freezing point of its water of composition, (b) placing the pre-cooled food within a vacuum chamber and pressing it down on a platen therein which is vapor-impervious and permeable to infra-red rays, thereby closing the pores of the food surfaces which engage the platen, (c) de-gassing the pre-cooled food within the vacuum chamber by progressively reducing the pressure therein to a level at which the temperature of the pre-cooled food remains substantially unchanged and at a first rate at which gases are partially evacuated from the cellular structure of the food without disruptive results, (d) evaporatively freezing the de-gassed food by further reducing the pressure in said chamber at a faster rate to a level causing the food to be frozen solid to form ice crystals therein which occupy the spaces vacated by said gases without rupturing the cellular structure, and (e) sublimating the water of composition of said frozen food by directing infra-red rays at said food through said platen, whereby sublimation of the food occurs only at the ice boundary adjacent the free surface thereof, thereby drying the food.

7. In the method of freeze-drying food having a cellular structure, the steps of:

(a) de-gassing the food in a vacuum chamber by progressively reducing the pressure therein to a level at which the temperature of the pre-cooled food remains above the freezing point but close thereto and at a first rate at which gases are partially evacuated from the cellular structure of the food without disruptive results, (b) evpaoratively freezing the de-gassed food by further reducing the pressure in said chamber at a faster rate to a level causing the food to be frozen solid to form ice crystals therein which occupy the spaces vacated by said gases without rupturing the cellular structure, and (c) sublimating the water of composition of said frozen food by applying heat thereto in said chamber to dry the food.

References Cited by the Examiner

UNITED STATES PATENTS

| | | | |
|---|---|---|---|
| 1,878,318 | 9/1932 | Pinder | 34—4 |
| 2,278,472 | 4/1942 | Musher | 34—5 |
| 2,400,748 | 5/1946 | Flosdorf | 34—5 |
| 2,513,991 | 7/1950 | Bradbury | 34—5 |
| 2,523,552 | 9/1950 | Birdseye | 34—5 |
| 2,668,364 | 2/1954 | Colton | 34—4 |
| 3,077,036 | 2/1963 | Neumann | 34—5 |

ROBERT A. O'LEARY, *Primary Examiner.*

NORMAN YUDKOFF, *Examiner.*